May 6, 1952     L. T. COOKSON     2,595,226
CONVEYER HAVING DUST SEPARATING AND REMOVAL MEANS
Filed Jan. 22, 1948     3 Sheets-Sheet 1

INVENTOR.
LEONARD T. COOKSON
BY
ATTORNEY

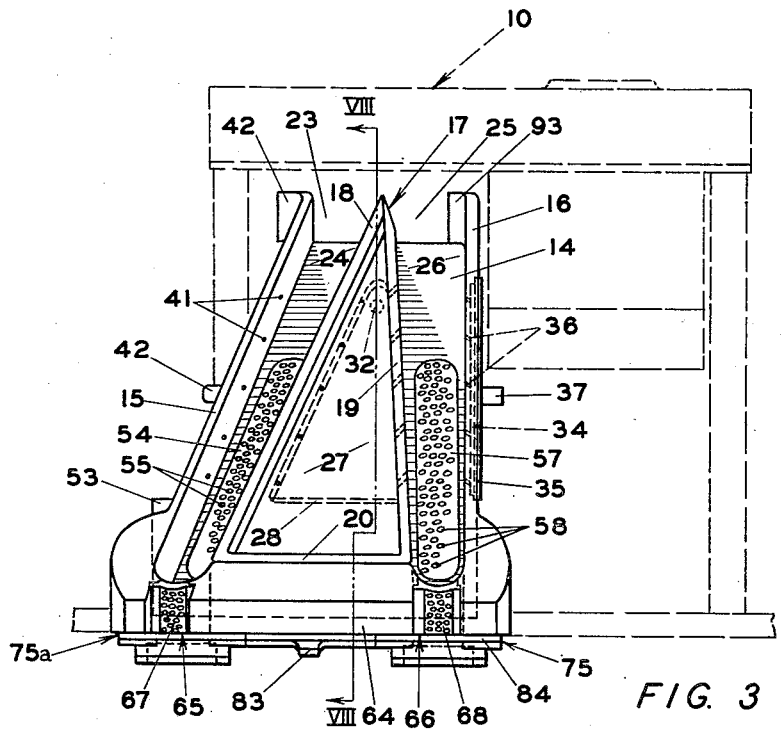
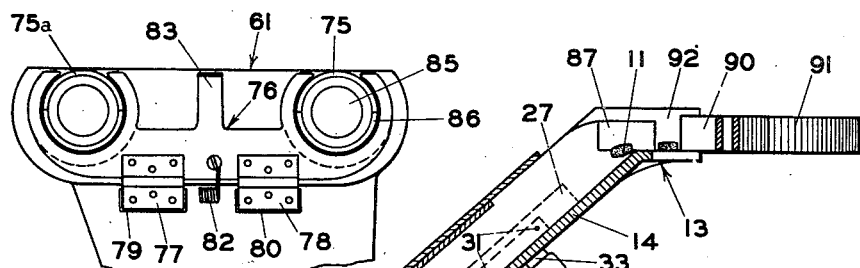
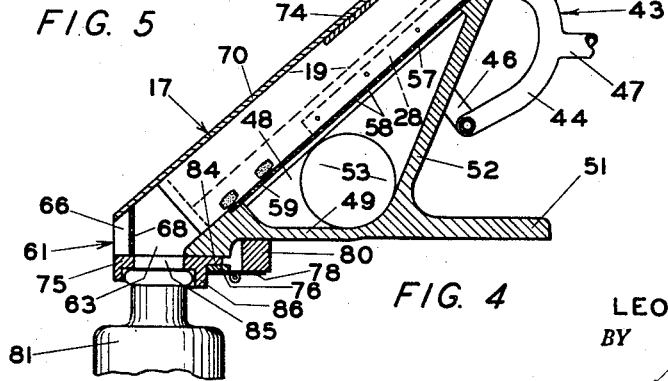
FIG. 3
FIG. 5
FIG. 4
INVENTOR.
LEONARD T. COOKSON
BY
ATTORNEY May 6, 1952  L. T. COOKSON  2,595,226
CONVEYER HAVING DUST SEPARATING AND REMOVAL MEANS
Filed Jan. 22, 1948  3 Sheets-Sheet 3
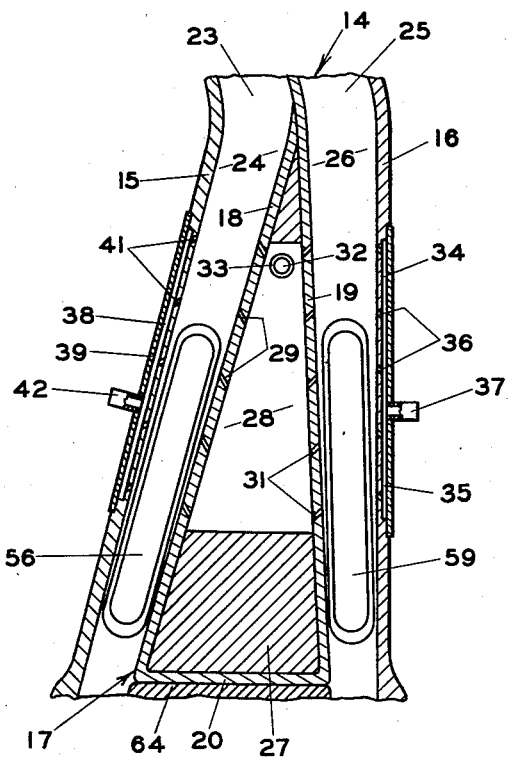
FIG. 7
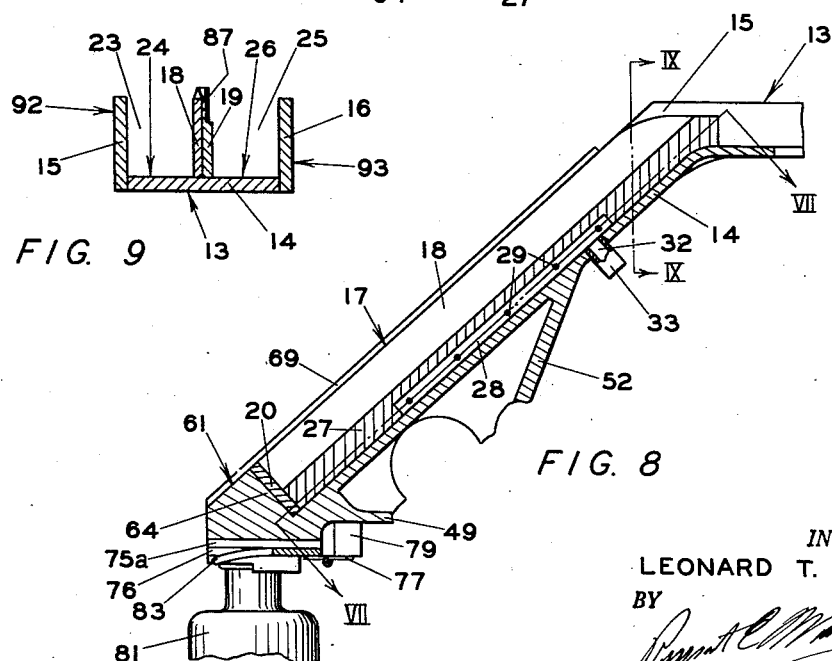
FIG. 9
FIG. 8
INVENTOR.
LEONARD T. COOKSON
BY 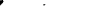
ATTORNEY

Patented May 6, 1952

2,595,226

UNITED STATES PATENT OFFICE 2,595,226

CONVEYER HAVING DUST SEPARATING AND REMOVAL MEANS

Leonard T. Cookson, Kalamazoo, Mich., assignor to The Upjohn Company, Kalamazoo, Mich., a corporation of Michigan Application January 22, 1948, Serial No. 3,706

4 Claims. (Cl. 209—12)

1

This invention relates in general to a method and means for removing dust adhering to articles transported by a conveyor chute, and specifically to one having means whereby there is dissipated any static electrical charge which may cause particles of dust to adhere to said material being conveyed in said chute.

Persons acquainted with the manufacture, sale and use of medicated tablets have long been aware of the need for a means by which the dust, which usually clings to the tablets as they come from the forming dies, can be satisfactorily and completely prevented from entering the containers, such as glass bottles, in which said tablets are usually packaged.

Said dust particles, which evade presently used methods of dust elimination, often cloud the inside walls of the said glass bottles, thereby obscuring the view of the contents of the bottle as well as impairing the appearance of the package.

Most presently used methods of dust elimination comprise some variation of an exhaust or blower system. However, if the tablets are conveyed or moved to any extent during their manufacture, they will take on a static charge which will cause said particles to adhere to said tablets with a force that can not usually be overcome by the exhaust or blower system. Due to the nature of the said static charge and the composition of the tablets, the charge soon dissipates after the tablets come to rest in the bottle. Any agitation of the bottle then causes said particles to separate from the tablets and collect in the bottom or upon the side walls of the said bottle. However, the requirements of economical manufacturing precludes permitting the tablets to come to rest long enough to dissipate their charge before entering the containers in which they will be sold.

Mechanical agitation has been employed to loosen dust particles from charged materials so that an exhaust system could carry said particles away. However, the static charge on said material is frequently so strong that the dust particles are either not disturbed, or are merely moved from one place to another.

Therefore, it becomes apparent that a method and means must be provided for eliminating the charge on the tablets so that said dust particles will not be carried into the bottles with said tablets. Furthermore, the speed of the said tablets must be retarded through the conveyor chute so that there will be time to neutralize the static charge on said tablets before they

2 reach the containers at the lower end of the chute.

Accordingly, it is a primary object of my invention to provide a method and means for separating dust particles from medicated tablets as said tablets pass through a conveyor chute from a tablet making machine to glass containers in which they are to be sold.

A further object of the invention is to provide a method and means as aforesaid in which the static charge holding the dust to the tablets is first neutralized and the dust is then removed and carried away.

A further object of the invention is to provide the aforesaid method and means operable without slowing the speed of conventional tablet making procedures.

A further object of the invention is to provide a method and means, as aforesaid, which may be practiced in conjunction with existing, conventional tablet making equipment.

A further object of the invention is to provide a method and means which will accomplish the aforesaid objects while the tablets are traveling from the tablet making machine to whatever containers are provided to receive them.

A further object of the invention is to provide a method and means which will accomplish the aforesaid objects without adding material cost to the tablet making process.

A further object of the invention is to provide a method and means which will accomplish the aforesaid objects and which has ample capacity for easy adaptation to a variety of sizes and kinds of conventional tablet making machines.

A further object of my invention is to provide a conveyor chute having a dust loosening, separating and collection mechanism including means by which the speed of the tablets, as they pass down said conveyor chute, may be retarded, thereby giving the means for eliminating the static charge sufficient time to neutralize the static charge on said tablets.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a method for first neutralizing the said static electrical charge and then entraining said particles in a moving gas. As specific mechanism for practicing this method, I have provided a conveyor chute comprising a pair of inclined, somewhat divergent, enclosed troughs through which medicated tablets may pass from a tablet making machine into glass containers. The side walls of said troughs are provided with a plurality of openings through which a gas under pressure is forced into said troughs. The bottoms of said troughs are provided with a plurality of openings through which said gas and dust particles entrained thereby are exhausted away from the chute.

A radioactive substance, such as polonium, emitting primarily, alpha radiation, is placed within each said trough to create an ionization zone by means of which the static charge on the tablets may escape. With the static charge, which causes said dust particles to adhere to said tablets, neutralized said dust particles may then be entrained and removed by said gas.

In the particular application of the invention hereinafter described, it is believed that the static charge is on the tablets rather than on the dust particles. It appears probable that this static charge is negative because it has been established that polonium, which emits positively charged alpha particles, neutralizes the static charge on said tablets when they pass through an ionized zone created by said polonium. This static charge may be acquired by the tablets while they are being compressed from powder, while they are being conveyed to the containers after they have been manufactured, or during some other normal operation.

For one preferred embodiment of the conveyor chute having a dust collection mechanism, reference is made to the accompanying drawings in which:

Figure 3 is a front elevation view of said discharge chute.

Figure 4 is a sectional view of Figure 1 taken along the line IV—IV.

Figure 5 is a bottom view of the outlet end of said discharge chute and the attached bottle neck adapter mechanism.

Figure 7 is a sectional view of Figure 3 taken along the line VII—VII.

Figure 8 is a sectional view of Figure 3 taken along the line VIII—VIII.

Figure 9 is a sectional view of Figure 1 taken along the line IX—IX.

*Construction*

Figure 1:
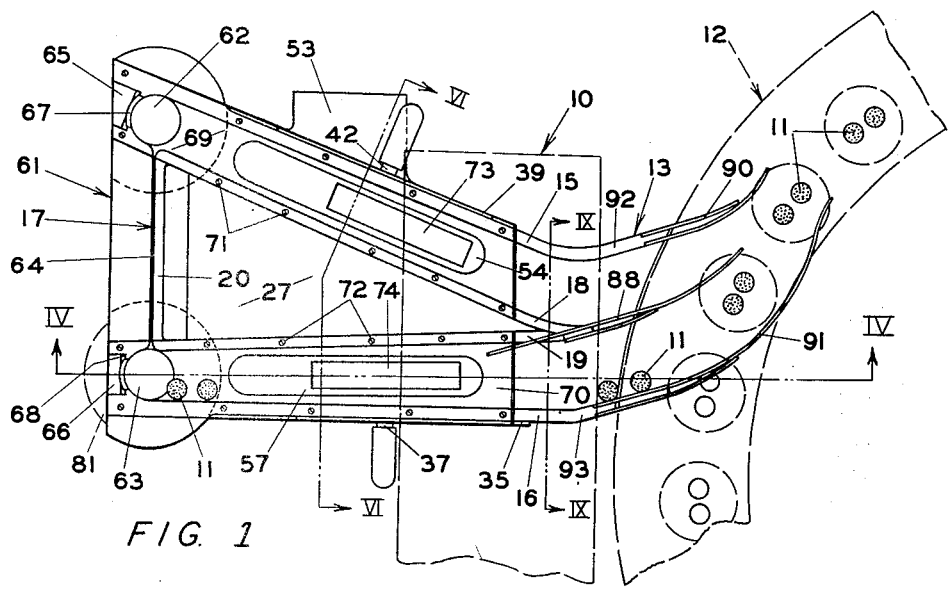
Figure 1 is a plan view of the said discharge chute including broken, phantom views of a selection mechanism and a portion of a tablet making machine in their proper relationship to said chute.

The conveyor chute, which is shown in the above mentioned drawings, has been designed, for illustrative purposes only, to be used in conjunction with the "Vane Type Counter for Tablet Machines" which is disclosed in the co-pending application of Cookson and Klettke, Serial No. 765,854, now Patent No. 2,518,868. The counter 10 which appears in phantom in Figures 1, 2 and 3, removes the finished tablets 11 from the revolving table 12 of a conventional tablet making machine and selectively directs said tablets 11 into one side or the other of the upper end 13 of said conveyor chute.

In the following description the words "leftward" and "rightward" are used with reference to the conveyor chute, as illustrated in Figure 3, in order to simplify its disclosure and no limitation on the scope of the invention is thereby intended.

The said conveyor chute, which may be fabricated from any suitable material such as cast iron, steel plate or a combination of both, has an inclined bed plate 14 which extends between, is supported upon and is secured to a leftward side plate 15 and a rightward side plate 16, as appearing in Figure 3. The said bed plate 14, which is wider at the lower end than at the upper end is engaged by and secured to a hollow, triangularly shaped, central member 17 (Figures 4, 7 and 8), having a leftward wall 18, a rightward wall 19 and a front wall 20.

The said central member 17 is positioned upon the top of said bed plate 14 midway between the leftward and rightward side plates 15 and 16 so that a leftward trough 23 (Figures 3, 6 and 7) is created by the upper portion of the leftward side plate 15, the leftward portion 24 of the bed plate 14 and the leftward wall 18 of the central member 17. A rightward trough 25 is created by the rightward wall 19 of the central member 17, the rightward portion 26 of the bed plate 14 and the rightward side plate 16. The upper edges of the side plates 15 and 16 and the walls 18 and 19 of the central member 17 preferably, but not necessarily, lie within the same plane, which plane is substantially parallel with the bed plate 14.

A center plate 27 (Figures 6, 7 and 8) which lies within and is secured to the walls 18, 19 and 20 of the central triangular member 17, bears snugly against the bed plate 14 and may be made of heavy steel plate. It may, however, under some circumstances be desirable to fabricate the central member 17 and the center plate 27 in a single member by casting. A central bottom portion of said center plate 27 is removed, as by milling, to provide a center plate plenum chamber 28 in said center plate adjacent to said bed plate 14 and between the leftward and rightward walls 18 and 19, respectively.

A plurality of emission holes 29 (Figure 7) are provided in the said leftward wall 18, which holes communicate between the center plate plenum chamber 28 and the leftward trough 23. A plurality of emission holes 31, which are provided in the rightward wall 19, communicate between said plenum chamber 28 and the rightward trough 25. A gas entry opening 32 in the bed plate 14 communicates between the plenum chamber 28 and a bottom connection pipe 33 (Figures 4, 7 and 8), which pipe extends from the under side of said bed plate 14.

A right side plenum chamber 34 (Figures 6 and 7) is created in the upper portion of said rightward side plate 16 by means of an elongated, shallow recess in the outside surface thereof adjacent to and parallel with said rightward trough 25, which recess is closed with a cover plate 35. A plurality of emission holes 36 in said side plate 16 communicate between the right plenum chamber 34 and the rightward trough 25. A right side connection pipe 37, which cooperates with an appropriate opening in the cover plate 35, is secured to and extends from the outside of said cover plate.

A left side plenum chamber 38 is created in the upper portion of the said leftward side plate 15 by means of an elongated recess in the outside thereof adjacent to and parallel with said leftward trough 23, which recess is closed with a cover plate 39. A plurality of emission holes 41 in said side plate 15 communicate between the left plenum chamber 38 and the leftward trough 23. A left side connection pipe 42, which cooperates with an appropriate opening in the cover plate 39, is secured to and extends from the outside of said cover plate.

The said emission holes 29, 31, 36 and 41 are preferably positioned so that any gas forced through said holes from the plenum chambers 28, 34 and 38, respectively, will enter the troughs 23 and 25 in a direction opposing the normal downward travel of said tablets 11, thereby impeding their free passage.

Figures 2, 6:
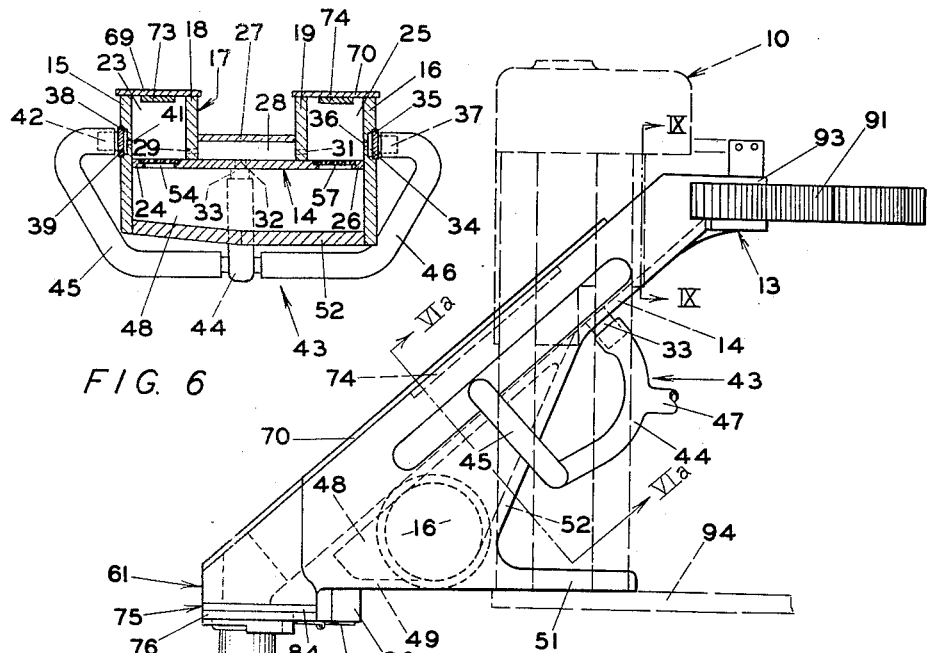
Figure 2 is a side elevation view of said discharge chute shown in Figure 1.
Figure 6 is a sectional view of Figure 1 taken along the line VI—VI, said section being perpendicular to the bed plate of the chute as indicated by the line VIa—VIa in Figure 2.

As appearing in Figures 2, 4 and 6, a gas under pressure may be supplied to said plenum chambers 28, 34 and 38 from any suitable source, not shown, by means of any convenient, conventional gas supply tube system 43, comprised of a primary supply tube 44, a left secondary supply tube 45 and a right secondary supply tube 46. One end of said tube 44 engages the bottom connection pipe 33 while the other end thereof is engaged by one end of each of said tubes 45 and 46, whose other ends engage the connection pipes 42 and 37 respectively. An entry tube 47, preferably integral with said primary tube 44, connects said tube system 43 with the source of gas.

An exhaust header 48 is provided beneath the inclined bed plate 14 between the lower portions of the leftward and rightward side plates 15 and 16 respectively (Figures 1, 2, 4 and 6). The bottom 49 of said exhaust header 48, which has an integral flange 51 whereby the conveyor chute is supported, is integral with or suitably secured to the lower end of the bed plate 14 in a substantially horizontal position. A rear wall 52, which completes the closure of the exhaust header 48, is engaged along its lower edge by the exhaust header bottom 49 and along its upper edge by the bed plate 14. The said bed plate 14, the exhaust header bottom 49, including the integral flange 51, and the rear wall 52 may constitute a single casting as here shown, or may be fabricated from pieces of steel plate which are secured to each other in any suitable manner, such as by welding.

An exhaust outlet 53 is provided in that lower portion of one of said side plates, here the leftward side plate 15, which enclose said exhaust header. Said outlet 53 may be connected in any convenient manner to an appropriate exhaust system, not shown.

An exhaust plate opening 56 (Figure 7) in the leftward portion 24 of the bed plate 14 provides communication between the exhaust header 48 and the leftward trough 23. An elongated, exhaust plate 54 (Figures 3 and 6), having a plurality of outlet openings 55, therethrough, is held in said exhaust opening 56. Likewise, an exhaust plate opening 59 (Figure 7) in the rightward portion 26 of the bed plate 14 provides communication between the said exhaust header 48 and the rightward trough 25, as shown in Figures 4 and 7. An elongated exhaust plate 57, having a plurality of outlet openings 58, therethrough, is held in any convenient manner in said exhaust opening 59. The upper surfaces of said exhaust plates 54 and 57 are flush with the upper surface of the bed plate 14.

An outer portion 61 of the exhaust header bottom 49 (Figure 8), on the side of said exhaust header bottom remote from said integral flange 51, extends outwardly beyond the lower edge of the bed plate 14, and upwardly to the plate of the upper edges of the side plates 15 and 16. A pair of vertical tablet openings 62 and 63 (Figures 1 and 4) are provided in the horizontal part of the outer portion 61 of the bottom 49, one adjacent to the lower edge of each of the said troughs 23 and 25 and communicating with them. The inward vertical face 64 of the outer portion 61 of the exhaust header bottom 49 bears against the front wall 20 of the central triangular member 17.

A pair of air inlet openings 65 and 66 (Figures 3 and 4) are provided in the outer portion 61, one adjacent to and communicating with, each of the said tablet openings 62 and 63. A pair of perforated plates or wire screens, 67 and 68, of the proper size are inserted into each of the said air inlet openings 65 and 66, respectively, and define the lower ends of each of said troughs.

The troughs 23 and 25 are preferably, but not necessarily, covered with a pair of transparent top sheets 69 and 70 (Figures 1 and 2), which may be fabricated from any suitable material such as methyl methacrylate. The top sheet 69 is removably secured in a substantially air tight manner by means of the stud bolts 71 to the upper edges of the leftward side plate 15, the leftward wall 18 of the central member 17, and the upper surface of the outer portion 61 of the exhaust header bottom 49. The top sheet 70 is similarly removably secured in a substantially air tight manner by means of the bolts 72 to the upper edges of the rightward side plate 16, the rightward wall 19 and the upper surface of the outer portion 61. The said pair of top sheets 69 and 70 might, however, be replaced by a single sheet without departing from the scope of the invention. Said single sheet would, of course, be secured to the same above mentioned parts of the conveyor chute.

A pair of strips 73 and 74, coated with a radioactive substance, such as polonium, which emits, primarily, alpha radiation, are positioned one within each of the said troughs 23 and 25. Said strips 73 and 74 may be secured to and suspended from the inside surfaces of the top sheets 69 and 70, respectively, in any conventional manner, but preferably with their radioactive coatings facing downwardly. They are of sufficient length to ionize the air within a substantial length of the chute, the exact length being variable according to the rate of travel of tablets down the chute. In any event, it should be long enough to effect sufficient ionization of the air within the chute to permit substantially complete neutralization of the static charge on the tablets passing down said chute. This will be a function of various factors, including the rate of travel of the tablets, their size, their material and the extent of their charge. In the particular embodiment here shown, involving a stainless steel trough placed at an angle of about 45 degrees with the horizontal and operating with standard turntable-type tablet making machines, the placing in each trough of a strip coated for an area five inches long and one half inch wide with polonium emitting primarily alpha radiation of intensity of about one mille curie per square inch has been found wholly adequate for all usual situations.

A pair of bottle adapters 75 and 75a are removably held in alignment with the said tablet openings 63 and 62, respectively, in said exhaust header bottom 49 by means of an adapter clamp 76 (Figures 3, 4, 5 and 8). Said clamp 76 is pivotally secured, by means of the hinges 77 and 78, to a pair of hinge blocks 79 and 80 which are in turn affixed, as by welding, to the exhaust header bottom 49. A spring 82, which is secured to said adapter clamp 76 and the exhaust header bottom 49, tends to hold said adapter clamp 76 firmly against the horizontal under side of the outer portion 61 of said exhaust header bottom 49. Said adapter clamp 76 may be moved away from said bottom outer portion 61 by the lever arm 83 which is preferably an integral part of said adapter clamp and positioned midway between the portions of said clamp which engage said adapters.

The one adapter 75 is preferably, but not necessarily, identical to the other adapter 75a. Therefore, a detailed description of the adapter 75 will be understood to apply to the adapter 75a, also. The adapter 75 has a top flange 84 whose upper surface is held against the said outer portion 61 of the exhaust header bottom 49 by said adapter clamp 76. The tablet opening 85 in said adapter is preferably aligned with, and of the same diameter as, the tablet opening 63 in said bottom outer portion 61. A semi-circular flange 86, depending from the lower side of said adapter, concentric with and adjacent to said tablet opening 85, provides a stop against which the lip of the glass container 81 is pressed in order to align the opening in said bottle with the tablet opening 85 in said adapter 75.

The upper end of the rightward wall 19 has a cut away side 87, shown in Figures 4 and 9, which is slidably associated with a selecting finger 88. Said selecting finger 88, which is reciprocably actuated in a horizontal direction by the said counter 10, selectively sweeps the finished tablets 11 off of the revolving table 12 of a conventional tablet machine, into the upper end 13 of the conveyor chute, and down one or the other of the troughs 23 and 25. The operation of said counter 10 is completely disclosed in the Cookson and Klettke co-pending application, Serial No. 765,854, now Patent No. 2,518,868.

A leftward fixed finger 90 and a rightward fixed finger 91 (Figure 1) are attached as by welding to the upper, (rearward extremities 92 and 93 of the leftward and rightward side plates 15 and 16, respectively. Said fixed fingers are preferably fabricated from a light, resilient material which will collapse, if it becomes fouled upon the revolving table 12, rather than damage either the table, the conveyor chute or the counter. The rightward finger 91 continuously sweeps the circular path of the tablets 11 and will intercept said tablets and direct them down the rightward trough 25 if the selecting finger 88 is in the retracted position, as appearing in Figure 1. When the finger 88 is extended, it will intercept said tablets 11 and direct them down the leftward trough 23. Further details of the above mentioned direction mechanism are shown in my Patent No. 2,235,286.

*Operation*

In order to operate the preferred embodiment of my conveyor chute herein disclosed, the entry tube 47 of the gas supply tube system 43 is coupled with a suitable source of gas, such as air, under pressure. The exhaust outlet 53 of the exhaust header 48 is coupled with a suitable exhaust system (not shown), and the upper end 13 of the conveyor chute is brought up to, but not engaging, the edge of the revolving table 12 of a conventional tablet making machine. A suitable selection device, such as the aforementioned counter 10 with its selecting finger 88 is properly positioned with respect to said conveyor chute and the said revolving table 12. As the table 12 rotates the selecting finger 88 directs the tablets into either the leftward trough 23 or the rightward trough 25 according to the adjustment of the counter 10.

The conveyor chute is secured, as by bolting, to a stationary part 94 of said tablet making machine by means of the integral flange 51. Appropriate adapters 75 and 75a, suited to the particular glass containers 81 to be filled, are clamped in position against the bottom outer portion 61 by the adapter clamp 76. The glass containers 81 are positioned against the flanges 86 on the adapters and the apparatus is now ready for operation.

The gas is supplied to the plenum chambers 38, 28 and 34 through the connection pipes 42, 33 and 37, respectively, from the gas supply tube system 43, and thence passes through the emission holes 29, 31, 36 and 41 to the associated troughs. From the troughs the gas passes through the groups of openings 55 and 58 into the exhaust header 48 and thence through the exhaust outlet 53. The exhaust outlet 53 and the openings 55 and 58 are, however, of capacity sufficiently greater than that of the emission holes that when all parts are in operating adjustment a substantial quantity of outside air will be drawn in through the upper and lower ends of the troughs, the drawing in at the lower end being through the screens 67 and 68. The upward inclination of the emission holes 29, 31, 36 and 41 is also of value here in that it tends to assist the entry of air through the screens 67 and 68 at the lower end of the troughs and to retard the entry of air through the upper ends of the troughs. In this way the greater portion of air flow through the troughs, particularly at the lower ends of the troughs, through which the tablets pass after being electrically discharged, is opposite to the direction of movement of the tablets by which maximum dust removal results are secured.

The combined retarding effects of the gas emitted through said emission holes 29, 31, 36 and 41 and the air drawn through the perforated plates 67 and 68 also cushion the impact of said tablets against the lower ends of the said troughs and thereby further reduce the amount of dust particles likely to reach the glass containers 81. Without such cushioning, the impact of said tablets may be sufficiently great that pieces of tablet are chipped off and drop into the glass containers. In the event that an occasional chip is removed from said tablets, in spite of the cushioning, said chips are entrained by the air drawn through said perforated plates and exhausted through said outlet openings 55 and 58.

The radioactive substance, here polonium, coated upon the strips 73 and 74, emits positively charged alpha particles, as aforesaid, which create a zone of ionized gas within and around each of the troughs 23 and 25 through which zones said tablets are caused to pass as they move down said troughs. The static charge on the tablets 11, which causes the said dust particles to cling to the tablets, is dissipated into said ionized gas as said tablets move therethrough.

The flow of gas emitted from said emission holes not only retards the speed of said tablets so that they spend a sufficient period of time in the ionization zone to assure complete discharge, but also disengages the said dust particles from the tablets as the static charge is neutralized. The gas and disengaged dust particles entrained thereby are then exhausted through the outlet openings 55 and 58 in the exhaust plates 54 and 57, respectively, into the exhaust header 48.

The tablets normally pass down one trough at a time, thereby permitting the operator to remove a full container 81 from engagement with a bottle adapter 75 and replace it with an empty container. The period during which a trough is not in use also permits the exhaust system to remove all traces of dust particles remaining in said idle trough before the selecting finger 88 changes position and redirects the flow of said tablets down such trough.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In an inclined conveyor for transporting medicated tablets from a tablet making machine to containers while removing dust particles therefrom, the combination comprising: a pair of divergent troughs extending downwardly and away from said tablet machine, said troughs each having side walls, a bottom and a top; a plenum chamber associated with each side wall of said troughs; a plurality of jet openings in said side walls communicating, respectively, between each of said troughs and each of said plenum chambers, through which jet openings a gas may be forced under pressure, the axis of said jet openings being at an acute angle to the longitudinal axis of said troughs and directing the gas emitted therefrom substantially opposite to the direction of flow of said tablets for retarding the speed of such flow and removing dust from said tablets; an exhaust header beneath said troughs; a plurality of openings in the bottom of each trough, providing communication from said troughs to said exhaust header and through which the gas in said trough and material entrained therein are exhausted; a plurality of openings in the lower ends of said troughs through which air may be drawn from outside of said troughs; a radioactive substance affixed to an inside portion of said troughs intermediate their ends for ionizing the gas throughout a zone around and within said troughs, through which said tablets must pass whereby the static charge, which causes dust particles to cling to the said tablets, will be neutralized; means supplying a gas under pressure to each of said plenum chambers and means exhausting gas and entrained particles from said exhaust header; all arranged and constructed so that the speed of the said tablets as they move down the said troughs is retarded by upmoving gas streams and so that the static charge on the said tablets is neutralized and said dust particles freed from said tablets, as said tablets pass through said ionized zone, whereby said dust particles may be exhausted through the said openings in the bottoms of said troughs and the tablets delivered to said containers free of said dust.

2. In an inclined conveyor for transporting medicated tablets from a tablet making machine to containers and concurrently freeing them of dust particles adhering thereto, the combination comprising: a trough extending downwardly and away from said tablet machine, said trough having side walls, a bottom and a top; a plenum chamber associated with a side wall of said trough; a plurality of jet openings in said side wall providing communication between said trough and said plenum chamber, through which openings a gas may flow under pressure, the axis of said jet openings being at an acute angle to the longitudinal axis of said trough and directing the gas emitted therefrom at least partially against the flow of said tablets for retarding the speed of such flow and removing said dust particles therefrom; an exhaust header beneath said trough; a plurality of openings in the bottom of said trough providing communication between said trough and said exhaust header and through which the gas in said trough and material entrained therein may be exhausted; a radioactive substance within said trough emitting primarily alpha radiation for ionizing the gas through a zone within said trough, whereby the static charge which causes dust particles to cling to the said tablets will be neutralized; means supplying gas under pressure to said plenum chamber and means exhausting gas and entrained dust particles from said exhaust header; all arranged and constructed so that the static charge on the said tablets is neutralized while said tablets pass through said ionized zone, whereby the dust particles will be freed from said tablets, thereby permitting said dust particles to be entrained by said gas and carried out through the said openings in the bottoms of said trough and the tablets delivered to said containers free of said dust.

3. In an inclined conveyor for the gravitational conveyance to receiving means of small articles having dust adhering thereto by electrostatic attraction, the combination comprising: a trough inclined downwardly, said trough having side walls, a bottom and a transparent top; a plenum chamber associated with a side wall of said trough; a plurality of jet openings in said side wall providing communication between said trough and said plenum chamber, through which openings a gas may flow under pressure, said jet openings being at an acute angle to the longitudinal axis of said trough and directing the gas emitted therefrom at least partially in a direction contrary to the flow of said small articles; an exhaust header beneath said trough; a plurality of openings in the bottom of said trough providing communication between said trough and said exhaust header and through which the gas in said trough and material entrained therein are exhausted; a radioactive substance within said trough emitting primarily alpha radiation for ionizing the gas through a zone within said trough, whereby the static charge which causes dust particles to cling to the said articles will be neutralized; means supplying gas under pressure to said plenum chamber and means exhausting gas from said exhaust header; all arranged and constructed so that the static charge on the said articles is neutralized as said articles pass through said ionized zone, whereby the dust particles will be freed from said articles, thereby permitting said dust particles to be exhausted through the said openings in the bottom of said trough and the articles delivered to said receiving means free of said dust.

4. In an inclined conveyor for transporting medicated tablets from a tablet source to containers while removing dust particles therefrom, the combination comprising: a pair of divergent troughs extending downwardly and away from said tablet source, said troughs each having side walls, a bottom and a top; a first plenum chamber disposed between and communicating with said troughs and a second plenum chamber associated with the side wall of said troughs remote from said first plenum chamber; means providing a plurality of jet openings in each of said sidewalls communicating between said troughs and said first plenum chamber said troughs and said second plenum chambers, through which jet openings a gas may be forced under pressure, the axis of each of said jet openings being parallel to the bottom of said troughs and at an acute angle to the longitudinal axis of each of said troughs and directing the gas emitted therefrom substantially oppositely to the direction of flow of said tablets for retarding the speed of such flow and removing dust from said tablets; an exhaust header beneath said troughs; a plurality of openings in the bottom of each trough, providing communication from said troughs to said exhaust header and through which the gas in said trough and material entrained therein are exhausted; a plurality of openings in the lower ends of said troughs through which air may be drawn from outside of said troughs; means supplying a gas under pressure to each of said plenum chambers and means exhausting gas and entrained particles from said exhaust header; all arranged and constructed so that the speed of the said tablets as they move down the said troughs is retarded by upmoving gas streams which streams also remove the loose dust particles from said tablets, said dust particles being exhausted through said openings in the bottom of said troughs.

LEONARD T. COOKSON.

REFERENCES CITED

The following references are of record in the file of this patent:

UNITED STATES PATENTS

| Number | Name | Date |
|---|---|---|
| 742,377 | Ayers | Oct. 27, 1903 |
| 968,984 | Ringland | Aug. 30, 1910 |
| 998,000 | Hermann et al. | July 18, 1911 |
| 1,085,921 | Lakey | Feb. 3, 1914 |
| 1,248,339 | Kallenboch | Nov. 27, 1917 |
| 2,264,683 | Smith | Dec. 2, 1941 |
| 2,324,823 | Chilson et al. | July 20, 1943 |
| 2,328,568 | Maxwell et al. | Sept. 7, 1943 |

FOREIGN PATENTS

| Number | Country | Date |
|---|---|---|
| 358,329 | Great Britain | Nov. 10, 1930 |
| 675,629 | France | Dec. 27, 1932 |

OTHER REFERENCES

Ser. No. 376,930, A. Peycelon et al. (A. P. C.), published May 25, 1943.